United States Patent [19]

Patton et al.

[11] Patent Number: 4,673,854

[45] Date of Patent: Jun. 16, 1987

[54] ELECTRONIC CROSS-LEVEL DETECTION SYSTEM

[75] Inventors: Wesley H. Patton, Atlanta; Jeffrey L. Thompson, Lawrenceville, both of Ga.

[73] Assignee: Southern Railway Company, Washington, D.C.

[21] Appl. No.: 636,718

[22] Filed: Aug. 1, 1984

[51] Int. Cl.$^4$ .................. B64C 17/06; E01B 35/02
[52] U.S. Cl. .................. 318/649; 318/624; 104/7.1; 104/7.2; 33/338; 33/287
[58] Field of Search .................. 33/287, 338, 366; 104/7 B, 8, 7 R; 250/215; 318/649, 648, 624; 340/689

[56] References Cited

U.S. PATENT DOCUMENTS

| | | | |
|---|---|---|---|
| 2,620,571 | 12/1952 | Varian | 33/366 |
| 3,494,299 | 2/1970 | Boyer | 33/287 |
| 3,659,345 | 5/1972 | Plasser | 33/287 |
| 3,736,486 | 5/1973 | Gould | 318/624 |
| 3,835,546 | 9/1974 | Jaquet | 33/338 |
| 3,895,287 | 7/1975 | Sun | 318/624 X |
| 3,908,163 | 9/1975 | Gilmore | 318/624 X |
| 3,996,454 | 12/1976 | Floyd | 318/565 |
| 4,184,266 | 1/1980 | Hurni | 33/366 |
| 4,341,160 | 7/1982 | Nielsen | 104/7 B |
| 4,414,541 | 11/1983 | Ho | 340/689 X |
| 4,470,199 | 9/1984 | Krezak | 33/366 |
| 4,542,795 | 9/1985 | Yoshimura | 33/366 X |
| 4,547,972 | 10/1985 | Heidel | 33/366 |
| 4,557,056 | 12/1985 | Kim | 340/689 |

FOREIGN PATENT DOCUMENTS 8500072 10/1985 PCT Int'l Appl. .................. 33/366

OTHER PUBLICATIONS

"Electromatic Tampers" mentions a patented Delta Levelling System which uses a precision designed pendulum arrangement (pp. 8 and 9).
Schaevitz "Operating Instructions, Installation Information, and Calibration Certificate for Servo Inclinometers".

Primary Examiner—William M. Shoop, Jr.
Assistant Examiner—Patrick C. Keane
Attorney, Agent, or Firm—Watson Cole Grindle & Watson

[57] ABSTRACT

An electronic levelling apparatus using an inclinometer mounted to a platform for sensing deviations from the horizontal and generating an output signal representative thereof, filtering the inclinometer output signal to remove electromagnetic and radio frequency interference, level-shifting the filtered inclinometer output signal to establish both positive and negative threshold voltages, determining positive and negative voltage level shifts to generate a level control signal therefrom and transmitting the level control signal to an actuating mechanism for maintaining the platform level.

1 Claim, 2 Drawing Figures

ELECTRONIC CROSS-LEVEL DETECTION SYSTEM

FIELD OF THE INVENTION

The present invention is directed to level detection systems, and more particularly to cross-level detection systems primarily used in the railroad industry for levelling track and/or determining the elevation of track.

BACKGROUND OF THE INVENTION

The invention is an improvement of levelling systems using pendulum-type apparatus to determine a horizontal position with respect to an opposite grade rail. Such systems are well known to the railroad industry and have been in use for many years. Such systems typically use a horizontal reference beam which is transmitted over the track being tamped, for example. The track is jacked parallel to a reference beam to provide 100% error corrections. Such systems utilize a modulated cone of light, from one of two infra-red projectors (one located over each rail) and selected over the grade rail, which is transmitted over a shadowboard calibrated to the top of both rails of the tie being tamped, into two receivers referenced to the tamped track at the rear of the machine, one receiver being located over each rail. The track and the shadow board are raised until the beam is intercepted at the selected height.

Typically, the receiver of the grade rail is calibrated directly to the top of the rail at the rear wheels of the machine. The cross-level receiver "floats" at all times regardless of track conditions, and is controlled with a fully automatic and precision designed pendulum arrangement to maintain a horizontal position with respect to the opposite grade rail. Such levelling systems are capable of accuracy within plus or minus 1/31" (1 mm) on the track.

Such pendulum type levelling systems are typically used with jack tampers, which are automated to the extent that the operator can select the desired raise and elevation.

The output of such a levelling system activates either one of two lead screw mechanisms located respectively at opposite ends of a platform on which is mounted the pendulum, to maintain the platform level by controlling the actuation of a respective one of the lead screws.

Such pendulum-type levelling systems are subject to many disadvantages, such as the need to maintain the oil in the pendulum mechanism, which oil is subject to wide viscosity changes resulting from the great temperature ranges over which the levelling system is required to operate. The pendulum-type levelling system is also bulky and heavy.

There is thus a need for an improved type levelling system to overcome the aforementioned disadvantages as well as to provide improved capability for track levelling operations.

PRIOR ART

U.S. Pat. No. 4,184,266 discloses railway surveying apparatus using a light beam transmitter for transmitting a beam along the track, a light beam receiver and an intermediate shadow board respectively mounted on rail-engaging buggies. A pendulum is mounted on the receiver buggy to measure the actual rail cross level condition at that point. A pendulum on the transmitter buggy and appropriate circuitry reference the apparatus to either the track center line or one of the rails.

The mobile track surfacing apparatus of U.S. Pat. No. 3,659,345 operates with two reference beams associated with respective rails and wherein the beam stops and receivers are held at a constant distance from the rails. The vertical position of each beam transmitter is automatically adjusted by drive motors operated in response to any deviation of the track from the horizontal in accordance with the difference between the actual and the desired superelevation. A front buggie carries a pendulum for surveying the superelevation of the track.

The measuring device of U.S. Pat. No. 3,835,546 uses a clinometer of the electrolytic spirit level type to supply an electrical signal proportional to the transverse slope of railway tracks. The clinometer is continually returned to the horizontal position by a motor receiving electrical signals from the clinometer.

The railway track treatment apparatus of U.S. Pat. No. 4,341,160 uses a clinometer to sense deviations from the horizontal. The equipment includes a levelling device regulated by two reference lines each determined by the alignment of an emitter, mask and a receiver which are sensitive to variations of illumination caused by the vertical displacement of the masks.

SUMMARY OF THE INVENTION

The present invention provides a greatly improved track levelling system by the substitution of an electronic inclinometer and comparator circuitry for the mechanical pendulum of the known levelling systems. The output voltage of the inclinometer is compared with a reference voltage level in both the positive and negative polarities to actuate relays to energize a lead screw motor for maintaining level the platform on which the inclinometer is mounted.

More specifically, the output of the inclinometer is filtered to integrate the output signal to reduce the affect of shock and vibration, thereby preventing erratic operation of the levelling system. The filtered inclinometer output signal is level-shifted to compensate for inclinometer mounting errors. The conditioned inclinometer output signal is then input to each of four comparators.

In the present embodiment the reference voltage is at ground potential and the inclinometer output voltage is compared to the reference voltage in comparator sections b and c. When the conditioned inclinometer output signal is below ground potential, i.e. negative, the comparator output signal of comparator section b lights an LED. Similarly, when the conditioned inclinometer output voltage is above ground or positive another comparator in comparator section c energizes an associated LED.

In sections a and d of the comparator, the reference voltage is offset from ground potential and potentiometers are provided for adjustment of the reference voltage from zero to approximately 300 mv. This offset voltage creates a deadband about the reference potential. The conditioned inclinometer output signal voltage must exceed the voltage offset of the appropriate comparator in comparator sections a and d before the respective comparator can turn on. For section a the offset is negative, and therefore the conditioned inclinometer output voltage must be lower than that of the negative offset to turn on the associated comparator. Section d of the comparator is identical with that of section a except for the input and voltage polarities.

The output of comparator sections a and d actuate solid-state relays. The control voltage is isolated from the output by means of an opto-isolator. The relays control AC currents, turning on only at the zero level crossover of the sine wave and off at zero load current. An internal snubber network reduces EMI and RFI generated by switching transients and eliminates false triggering caused by excessive dv/dt. One relay is controlled by comparator section a and another relay is controlled by comparator section d.

The inclinometer output activates the appropriate relays to keep itself level. A motor drives a lead screw which raises and lowers one side of the inclinometer platform, according to how the motor windings are energized.

BRIEF DESCRIPTION OF THE DRAWINGS

The above objects, features and advantages of the present invention are readily percieved from the following description of a preferred embodiment representing the best mode of carrying out the invention when taken in conjunction with the following drawings, wherein.

DETAILED DESCRIPTION OF THE PREFERRED EMBODIMENT

Figure 1:
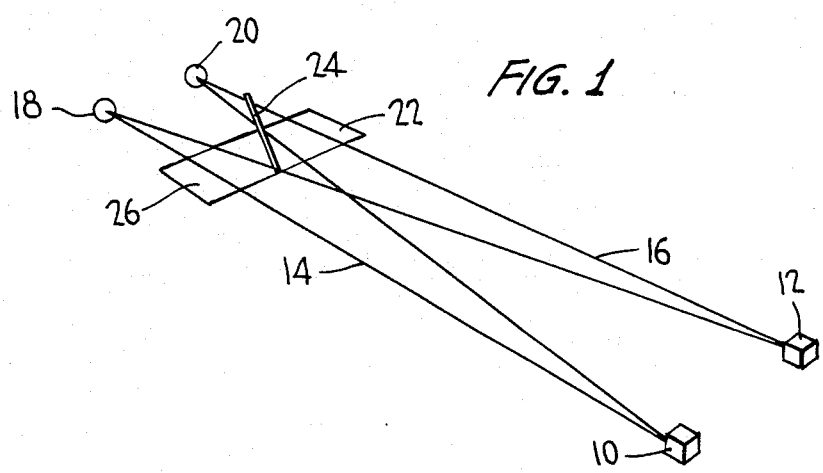
FIG. 1 is a schematic representation of the essential elements of a levelling system showing the location of the inclinometer.

With respect to FIG. 1, infra-red transmitters 10, 12 transmit respective infra-red beams 14, 16 to respective receivers 18, 20 in a manner well known to the art of rail levelling systems. The infra-red beams are intercepted by a shadow board 22, which is mounted on a platform intermediate the platforms respectively mounting the transmitters 10, 12 and receivers 18, 20. Inclinometer 24 is mounted on the same platform as the shadow board and is intended to replace the formerly used pendulum for determining the horizontal reference plane for the levelling system. Platform 26 is maintained level, or at a desired slope, by a lead screw which elevates or lowers one side or the other of platform 26 by appropriate actuation of a motor (not shown).

Figure 2:
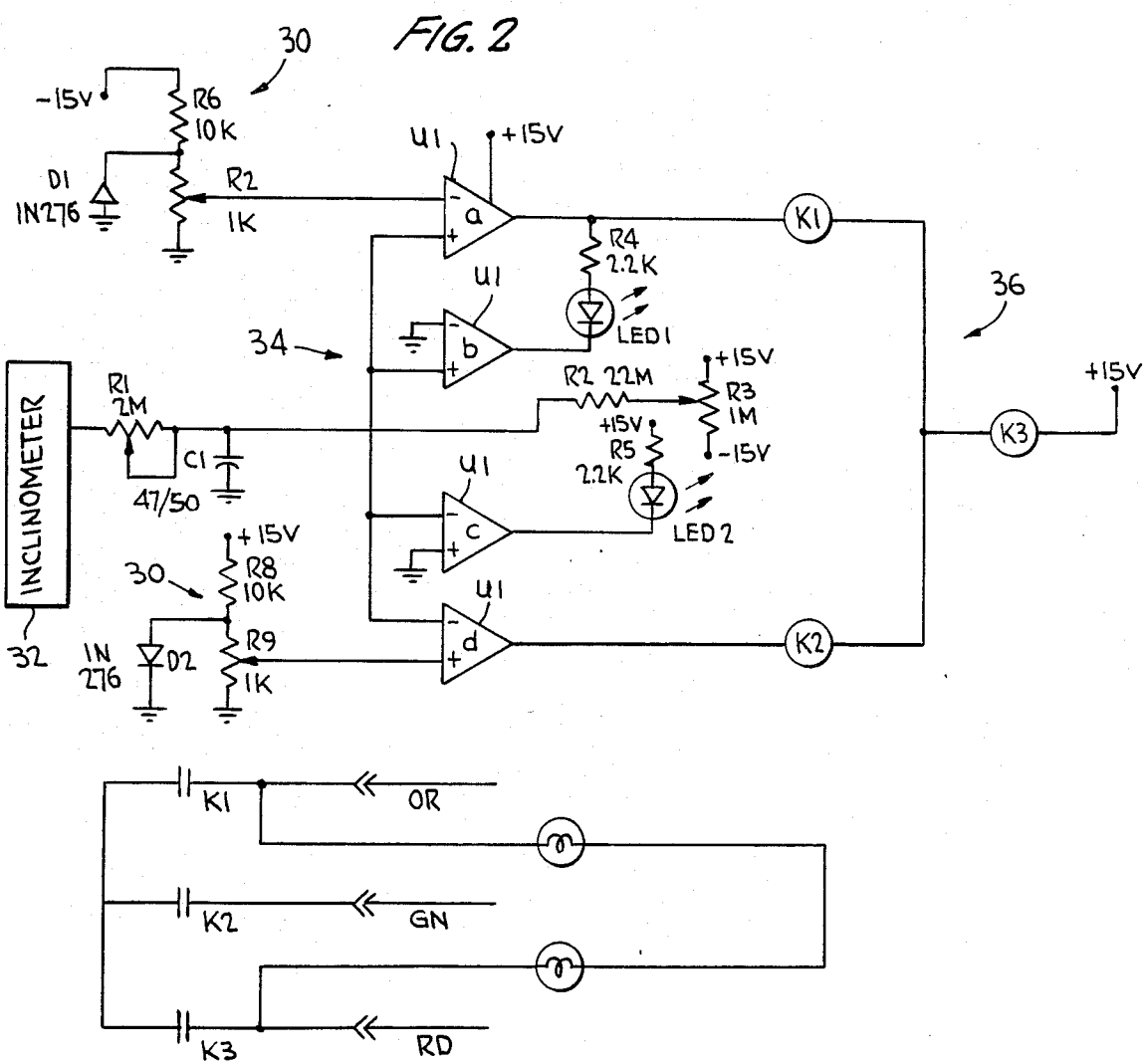
FIG. 2 is an electrical schematic of the quadrature comparator used for detecting the output of the inclinometer and generating control signals for maintaining the inclinometer platform level.

The control signals for controlling the motor are generated by the quadrature comparator circuitry illustrated in FIG. 2. The fundamental elements of the quadrature comparator circuitry illustrated in schematic form in FIG. 2 are the power supply 30, inclinometer 32, comparator 34, and output relays 36.

The power supply 30 is a high efficiency DC-to-DC converter operating at greater than 20 Khz. An input voltage is applied at a nominal voltage of 12 vdc. The output voltage is regulated to + and −0.7% at + or −15 vdc. The input current range is 50-540 mA, and the available output current is + or −150 mA. The input/output isolation is 500 vdc ($1 \times 10^9$ ohms minimum). The operating temperature is rated for −25° C. to +71° C. ambient. A detailed circuit of the power supply is not shown as it does not in and of itself form any part of the invention. One of ordinary skill in the art of the invention will be able to provide the necessary DC-to-DC converter generating the necessary output voltage and current meeting the aforementioned characteristics for proper operation of the inclinometer.

The inclinometer is a Schaevitz Engineering Model No. LSOC-3 providing an output voltage of + or −5 vdc for a corresponding tilt from horizontal of + or −30°. Its power requirements are + or −15 vdc at +10, −14 mA.

The comparator is a Texas Instruments integrated circuit model no. LM339AN which compares the inclinometer's output voltage with a reference level, and activates appropriate relays to maintain the inclinometer's platform at the level (horizontal) orientation. The output from the inclinometer 32 is filtered by means of resistor R1 and capacitor C1. Such a simple RC filter integrates the inclinometer output to reduce the effect of shock and vibration, which could cause erratic operation of the levelling system. After filtering, the filtered inclinometer output is level-shifted by the resistor combination R2, R3 to compensate for mounting errors in the installation of the inclinometer. The filtered and level-shifted inclinometer, hereinafter conditioned inclinometer output voltage, is then input to each of four microvolt comparators.

In sections b and c of comparator U1, the reference voltage is at ground potential. The conditioned inclinometer output voltage is compared to the reference voltage, in section b of comparator U1, when the conditioned inclinometer output voltage is below ground potential, the comparator output turns on, thereby lighting LED 1. Section c of comparator U1 operates identically with that of section b except the input voltage polarities. Resistors R4 and R5 establish diode current, respectively, for LEDs 1 and 2.

In sections a and d of comparator U1, the reference voltage is offset from ground potential by means of resistor R6, diode D1 and resistor R8 and diode D2. Potentiometers R7 and R9 enable adjustment of the reference voltage from 0 to + or − one germanium diode drop (approximately 300 mv). Such an offset creates a dead band near the reference level. The conditioned inclinometer output voltage must exceed the voltage offset of the appropriate comparator before that comparator can turn on. For section a of comparator U1 the offset is negative, therefore the conditioned inclinometer output voltage must be lower than that of the offset to turn on the comparator. Section d of comparator U1 is identical with that of section a with the exception of the input and voltage polarities.

The output relays are of the solid-state type. The control voltage is isolated from the output by means of an opto-isolator. The relays control AC currents, turning on only at the zero voltage crossing of the power sine wave, and off at zero load current. An internal snubber network (not shown) reduces EMI and RFI generated by switching transients and eliminates false triggering caused by excessive dv/dt. The control volatge range is 3-32 vdc. Relays K1-K3 are connected such that K3 is energized whenever either K1 or K2 are energized. This is possible because the relays are essentially current sensitive, drawing only about 15 mA. K1 is controlled by section a of comparator U1 and relay K2 is controlled by section d.

In operation, the conditioned inclinometer output voltage activates the appropriate relays to keep the platform on which the inclinometer is mounted level. Relays K1 and K2 energize the windings of an AC motor directly, while relay K3 supplies current to the motor winding through a phase shifter. The motor drives a lead screw (not shown) which raises or lowers one side of the inclinometer platform, according to how the motor windings are energized.

What is claimed is:

1. An electronic control circuit for generating control signals to maintain a platform level, comprising:

an inclinometer mounted to the platform to sense deviations from the horizontal and generating an output signal representative thereof;

means for filtering said output signal to eliminate EMI and RFI;

means for level-shifting the filtered output signal to compensate for mounting errors of said inclinometer;

means for generating respective positive and negative threshold voltages;

means for respectively comparing the level-shifted voltage with said positive and negative threshold voltages to generate level control signals therefrom and including a first comparator responsive to positive level shifts of said inclinometer output signal exceeding said positive threshold voltage and a second comparator responsive to negative level shifts of said inclinometer output signal exceeding said negative threshold voltage to generate said level control signals; and means for indicating the polarity of said positive or negative voltage level shifts and including respective comparator circuits for comparing the respective positive or negative level shifts with a ground reference.

* * * * *